Oct. 25, 1960  O. MUSGRAVE  2,957,561
CLUTCH DEVICE
Filed Oct. 20, 1958  3 Sheets-Sheet 1

INVENTOR.
ORLY MUSGRAVE
BY Toulmin & Toulmin
ATTORNEYS

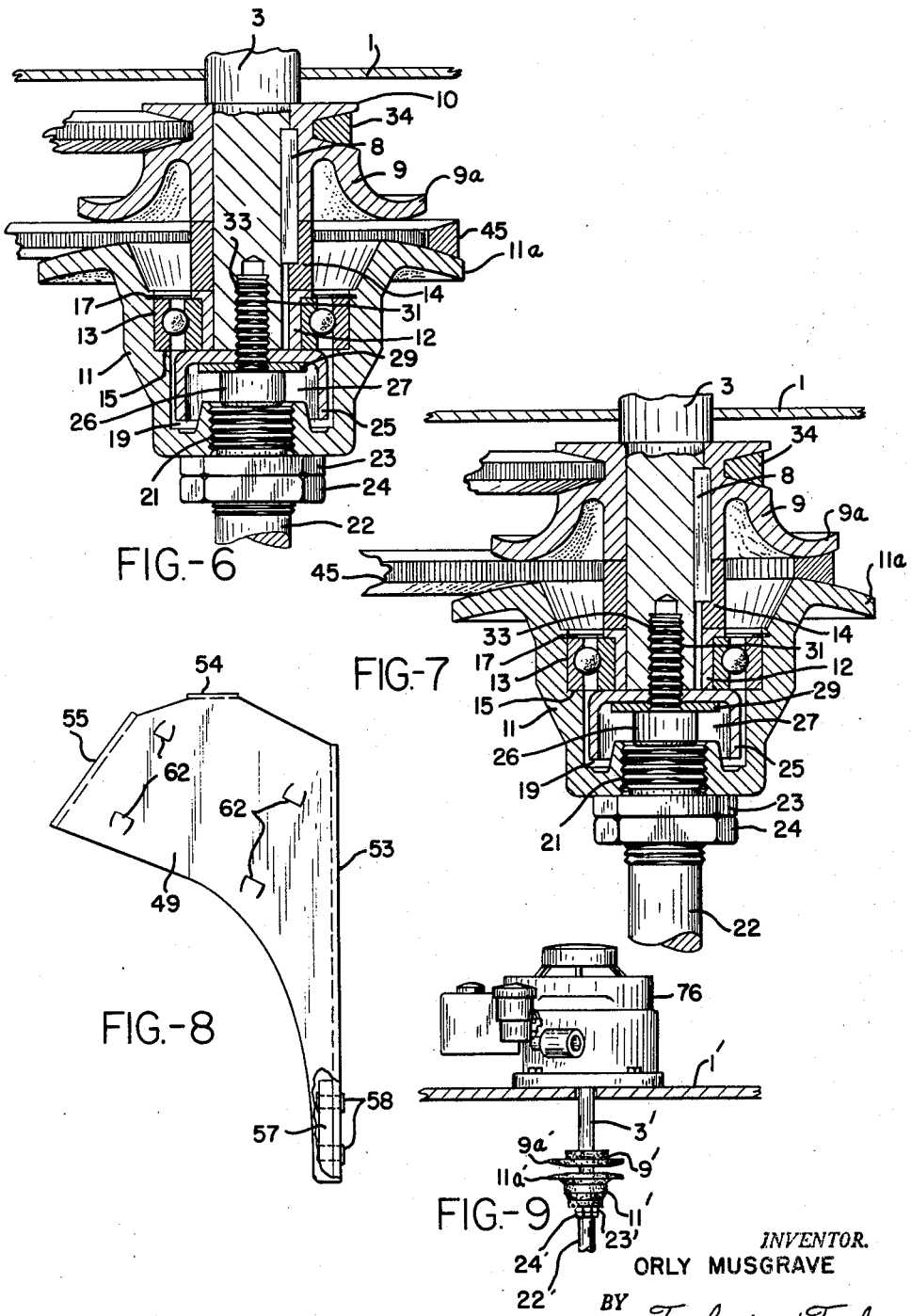

United States Patent Office 2,957,561
Patented Oct. 25, 1960

2,957,561
CLUTCH DEVICE

Orly Musgrave, 1731 Audubon Park Drive,
Springfield, Ohio

Filed Oct. 20, 1958, Ser. No. 768,340

10 Claims. (Cl. 192—11)

This invention relates to clutch devices.

This application is a continuation-in-part of my co-pending application, Serial No. 698,294, filed November 22, 1957, entitled: "Lawn Mower Cutting Blade Clutch Mechanism."

With many powered units such as mixers, pumps, compressors, generators, lawn mower blades, and the like, it is desirable to have the unit directly driven from a power source. This invention has as a primary object the provision of a clutch device which attains the advantages of direct drive while yet permitting disconnection of the powered unit from the drive shaft of the prime mover when so desired. The clutch of the invention may also be utilized however in connection with power transmission components, such as pulleys, gearing, friction wheels and the like, to attain step-up or step-down drives if so desired. Such is frequently useful in power take-offs in farm machinery applications.

The invention has as a further important object the provision of means for rapidly bringing a powered unit or power transmission component to a quick stop and maintaining the unit in the static condition until the clutch device is engaged.

In accordance with the invention a split pulley is carried on the shaft of a power source and one flange of the pulley is directly driven by the shaft. The complementary flange of the split pulley is mounted for rotation with a shaft component, which shaft component carries the power unit or power transmission component referred to hereinbefore.

To effect driving of the shaft component a belt, tightenable at the pleasure of the operator of the mechanism, passes over the split pulley to occasion clutching of the complementary flange with the driven flange. Thereby the power unit or power transmission component is readily clutched and de-clutched at the will of the operator, and advantages stemming from direct drive from the power source are attainable.

To effect quick stopping of the said shaft component, when the de-clutching action occurs, a brake block is automatically brought into secure engagement with the complementary flange simultaneously with the loosening of the belt.

The drive shaft of the prime mover suitably carries other power transmission elements, such as pulleys or gearing, for connection with driven units which it is desired to maintain in operation when the powered unit or power transmission component is disconnected. For example, self-propelled vehicles may have the transmission mechanism in operation when the powered unit or power transmission component is disconnected.

The invention will be more fully understood by reference to the following detailed description and accompanying drawings wherein:

Figure 6 is an enlarged fragmentary and sectional view illustrating the clutch device of invention in an inoperative position;

Figure 7 is a view similar to that of Figure 6 but with the clutch device in operative position;

Figure 8 is an enlarged plan view of a detail of the clutch of invention; and

Figure 9 is a view illustrating a further modification of the device of invention.

Figure 1:
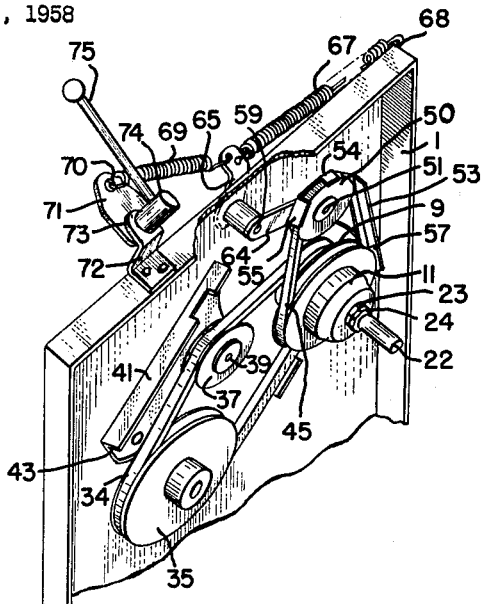
Figure 1 is a perspective view illustrating a basic arrangement of the clutch of invention mounted on an underside of a frame.
Figure 2:
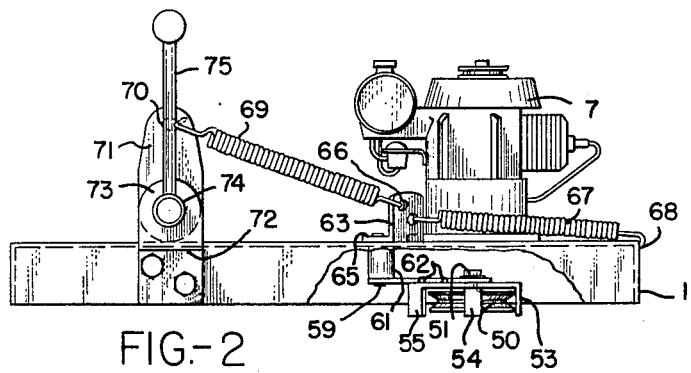
Figure 2 is an elevational view of the structure of Figure 1 with the prime mover shown and portions cut away to illustrate the clutch mechanism, the clutch device being in inoperative position.

Referring to the drawings, and first particularly to Figures 1, 6 and 7, the numeral 1 designates a downwardly flanged frame through which a drive shaft 3 extends in a vertical direction. The drive shaft 3 is the output shaft of a power source in the form of a gasoline engine 7 (Figure 2). As illustrated particularly in Figures 6 and 7 a key 8 secures a casting 9 to the shaft 3. The casting 9 includes a pulley flange 9a and a sheave 10.

A second casting or shell 11 opens upwardly and is formed with a flange 11a which is complementary to that of the flange 9a to define a V-belt pulley therebetween. The casting 11 is rotatably mounted but fixed against axial movement relative to the shaft 3. For this purpose a shouldered bushing 12 receives a ball bearing 13; the shouldered bushing 12 at its upper end abuts a sleeve 14 keyed to shaft 3. The casting 11 is provided with a seat 15 which abuts the lower end of the bearing 13, the bearing being retained between the seat, snap ring 17 and the shouldered bushing 12.

The numeral 19 designates a lower internal cavity of the casting 11, which cavity communicates with the exterior through a threaded opening 21. As clearly indicated in Figures 6 and 7, shaft 22 is threadedly received in the opening 21 and is itself provided with washers 23, 24 for secure retention of the shaft 22 on the casting 11. If so desired, the washers or the shaft itself may be welded to the casting for rotation therewith.

Inwardly of the casting and the cavity 19 is an inverted cup 25 which, as shown in the drawings, has a small clearance with the sides of the casting. The cavity 19 is suitably filled with grease designated at 27 in order to inhibit frictional effects of the inverted cup, in the rotation of the device. In the case of shock load on a driven component through shaft 22 the upper flat portion of the cup protects the bearings from impact inhibiting pitting of the bearings for this purpose the depending portion of the cup may be dispensed with.

A bolt 26 abuts a washer 29 which engages against the inverted cup 25 as shown. The bolt is provided with a threaded end 31 which is threadedly received in a lower threaded bore 33 of the shaft 3.

Figure 4:
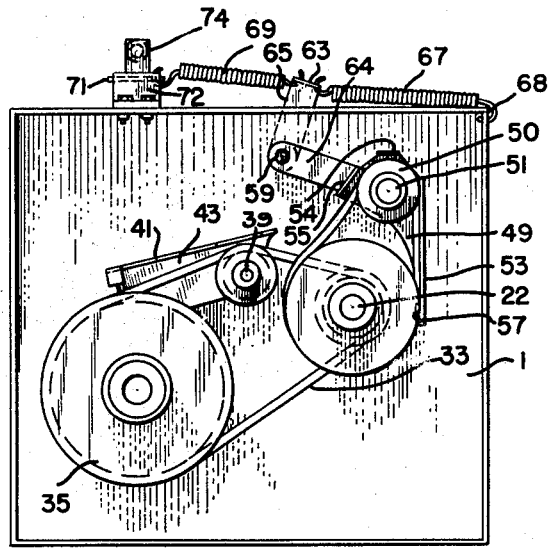
Figure 4 is a bottom plan view of the clutch device in the position illustrated in Figure 2.
Figure 5:
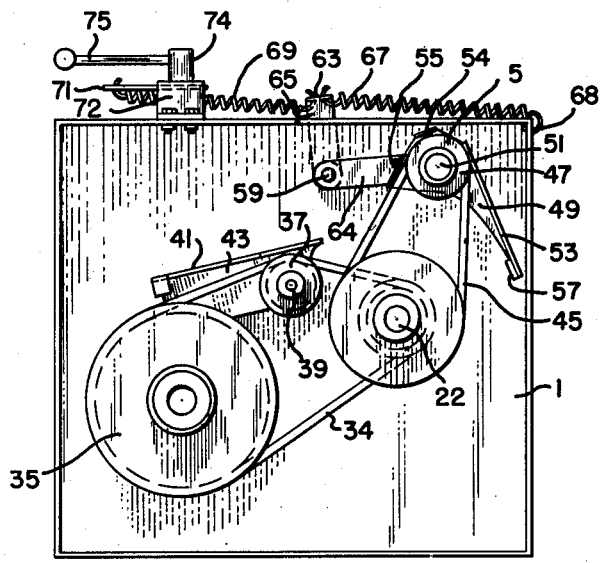
Figure 5 is a bottom plan view of the clutch device in the position illustrated in Figure 3.

Referring now particularly to Figures 1, 4 and 5 the sheave 10 (Figure 6) receives a V-belt 34 which passes over a driven pulley 35. This driven pulley 35 may itself be connected to any suitable driving mechanism for a desired purpose; for example, a gear box, which may be connected to the wheels of a powered vehicle. The belt 34 for the purpose of this invention may be considered as always tensioned. In order to maintain adequate tension on the belt 34 an idler pulley 37 is mounted on a pin 39, as shown in Figures 4 and 5, as engaged with the belt 34. Tensioning is effected by movement of the pulley 37 when pin 39 moves with the lever having the flange 41 and the flat portion 43, by which latter portion the pin 39 is carried. Movement may be effected in any suitable manner (not shown).

The clutch belt is designated by the numeral 45 and as may be noted from Figure 6 lies freely on the flange 11a when not in driving condition. (See also Figure 4.) A bellcrank 49 carries pulley 50 on a pin 51 and belt 45 passes over this pulley 50. Pulley 50 in cooperation with the bellcrank 49 serves to effect the tensioning of the belt 45 to place the casting 11 and its flange 11a in cooperable driving relation with the flange 9a. Flange 9a, of course, rotates with the shaft 3 when the shaft is powered by the engine.

Accordingly, appropriate movement of the pulley 50 controls the actuation of the casting 11 and its shaft 22. The shaft 22 may be directly connected with a mixer, blower, pump and similar device, or it may itself carry a power transmission element, such as a pulley.

A particular advantage of this arrangement and illustrated in the figures is that the belt 34 and the shaft 3 may continue to drive while the mechanism associated with the shaft, such as that at 22, may be disconnected at will. Further when connected to a blower, mixer, or the like, the advantages of direct drive are afforded by the shaft 22.

Referring now again to Figures 1–5, inclusive, the bellcrank 49 is provided with upstanding flange portions 53, 54, 55 which serve as belt guides. Further the flange 53 and its extremity is provided with a brake block 57 which, as clearly shown in Figures 4 and 5, move with the bellcrank 49. Thus, as shown in Figure 4, the brake block 57 is engaged against the flange 11a in the slackened condition of the belt 45, and accordingly the block is tending to brake the action of the flange 11a. This provides for quick stopping of the shaft 22 and any units associated therewith. As may be clearly seen from Figure 5 when the belt 45 is in a tightened condition, the brake block 57 is clear of the flange 11a.

The mechanism for the actuation of the bellcrank 49 includes a pin 59 which extends upwardly through the frame 1 within the bushing 61. The bushing 61 itself abuts against the underside of the frame 1, while the pin 59 passes through the frame and through a shiftable pivoted link having an upstanding portion 63 and a base portion 65. Pin 59 is peened over on the upper side of the portion 65 and is also peened over against a rock lever 64. This rock lever 64 passes through upturned portions 62 of the bellcrank (Figure 8) and is retained thereby to effect movement of the bellcrank and its associated pulley 50 when the link 63 is actuated.

The upper portion of the link 63 has openings 66 and a spring 67 is secured through one of these openings and has its other end retained at 68 by the frame 1. A similar spring 69 has one end retained in an opening 66 and the other end retained at 70 on a pivot plate 71. For support of the pivot plate 71 there is provided (Figure 1) a bracket 72 carrying an upwardly extending outwardly offset portion 73, through which there passes pivot pin 74. Pivot pin 74 itself receives a suitable handle 75.

Figure 3:
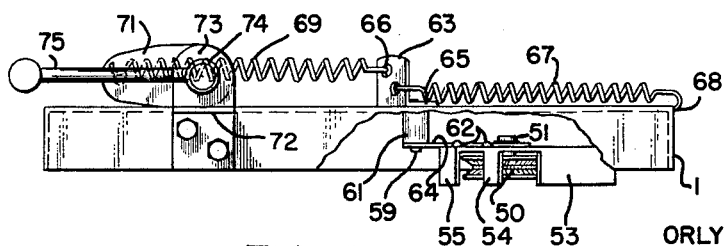
Figure 3 is a view similar to that of Figure 2 but with the prime mover removed and with the clutch device in an operative position.

Accordingly, in the practice of the invention, with the apparatus in the condition of Figures 1, 2 and 6, wherein the belt 45 lies freely in a horizontal position on the flange 11a, it is merely necessary to move the handle to the position of Figure 3 in order to effect tightening of the belt 45 and to place the apparatus in the condition of Figures 3, 5 and 7. It will be appreciated that this movement is readily effected without disturbing other driven units, such as that driven by the belt 34 and without alteration in the operation of the power source, such as the gasoline engine 7.

Movement of the handle 75 from the Figure 2 position to the Figure 3 position causes the tension spring 69 to overcome the bias of spring 67 and to move the shiftable link thereby rotating pin 59 and rocking the lever 64. Tension spring 69 (Figure 3) exerts a considerable stress between the handle and pivoted link drawing the two together and thereby maintaining the link positioned and the clutch belt 45 engaged.

Vibration in the clutch device is minimized by the provision of the grease in the cavity 19 about the retaining, inverted cup 25. Clearance between the cup and the shell 11 is preferably small.

Also it has been found that when the clutch belt 45 is provided in a substantially horizontal plane, substantially no undue wear occurs on the belt.

With respect to the modification illustrated in Figure 9, the power source designated at 76 mounted on a frame 1' is shown as having an output shaft 3'. This shaft mounts a split pulley composed of flanges 9a' and 11a', the shaft 22' being rotatable with the flange 11a'. The casting 11' is retained with relation to the shaft 3', as has been described in connection with the preceding figures, the primary difference being that no sheave, such as that shown at 10 in Figure 6, for example, is utilized in the device of Figure 9. It may be noted that the device of Figure 9 may be utilized in connection with a power scooter, wherein it is desirable to connect the transmission while permitting the power source 76 to operate.

It will be understood that this invention is susceptible to modification in order to adapt it to different usages and conditions and accordingly, it is desired to comprehend such modifications within this invention as may fall within the scope of the appended claims.

What is claimed is:

1. In combination, in a clutch device, a drive shaft, a shell supported by the said drive shaft for rotation relative to the said drive shaft but fixed against axial movement with respect to the shaft, a split groove pulley on the shaft having one flange secured to the shaft for rotation with the shaft and the other complementary flange of the split groove pulley on the shell, said shell having a component for transmitting power supported by the shell and rotatable with the shell, and said shell extending over an extremity of the drive shaft.

2. In combination, in a clutch device, a drive shaft, a flange of a split groove pulley fixed on the drive shaft for rotation with the drive shaft, a shell extending over an extremity of the drive shaft and supported by the drive shaft for rotation relative to the drive shaft but axially fixed with respect to the drive shaft, a complementary flange of the split groove pulley on the shell, said shell having a cavity adjacent the extremity of the drive shaft, means in said cavity engaged between said drive shaft and shell supporting the shell, and a shaft component in axial alignment with the said drive shaft for transmitting power carried by the shell for rotation with the shell.

3. In combination, in a clutch device, a drive shaft, a flange of a split groove pulley fixed on the drive shaft for rotation with the drive shaft, a shell extending over an extremity of the drive shaft, a bearing rotatably supporting the shell on the drive shaft, means including said bearing retaining the shell against axial movement relative to the drive shaft, said shell having a cavity adjacent the extremity of the drive shaft, an inverted cup in said cavity and engaged with and in supporting relation to said bearing, a bolt in said cavity passing through said cup and threaded into said drive shaft, a lubricant in said cavity around said inverted cup, and a shaft component for transmitting power, in axial alignment with said drive shaft and carried by said shell.

4. In a clutch device, a drive shaft of a prime mover, a split groove pulley having one flange secured to the shaft for rotation with the shaft on the shaft axis and the other complementary flange supported by the shaft, for rotation relative to the shaft, a belt passing in the groove of the split pulley and normally lying free in the split grooved pulley, a second pulley also receiving the said belt, said pulleys providing a closed path for the belt, means for tightening the belt on the said pulleys to cause the belt to grip the flanges of the split pulley for rotation of the flanges together, and a component for transmitting power supported for rotation with the complementary flange and in axial alignment with the said drive shaft.

5. In a clutch device, a bellcrank, a pulley supported by the bellcrank and movable with the crank, a split groove pulley in spaced relation with the bellcrank and the pulley thereon, a prime mover drive shaft supporting one flange of the split groove pulley fixedly for rotation with the shaft and supporting the complementary flange of the split groove pulley rotatably but against axial movement relative to the shaft, a component for transmitting power supported for rotation with the complementary flange and in axial alignment with the said drive shaft, a belt trained over the pulleys, an arm of the bellcrank extending toward the complementary flange, a brake block on the arm engageable with the complementary flange in a slackened condition of the belt, said belt being tightened on the pulleys in one direction of movement of the bellcrank and slackened by an opposite direction of movement of the bellcrank.

6. In a clutch device, a bell crank, a rock lever supporting the bell crank, a pulley supported by the bell crank and movable with the bell crank, a split groove pulley in spaced relation with the bell crank and the pulley thereon, a prime mover drive shaft supporting one flange of the split groove pulley fixedly for rotation with the shaft and supporting the complementary flange of the split groove pulley rotatably but against axial movement relative to the shaft, a component for transmitting power supported for rotation with the complementary flange and in axial alignment with the said drive shaft, a belt trained over the pulleys, an arm of the bell crank extending toward the complementary flange, a brake block on the arm engageable with the complementary flange in a slackened condition, and means to rock said rock lever to thereby move said bell crank, said belt being tightened on the pulleys in one direction of movement of the bell crank and slackened by an opposite direction of movement of the bell crank.

7. In a clutch device, a bell crank, a rock lever supporting the bell crank, a pulley supported by the bell crank and movable with the bell crank, a split groove pulley in spaced relation with the bell crank and the pulley thereon, a prime mover drive shaft supporting one flange of the split groove pulley fixedly for rotation with the shaft and supporting the complementary flange of the split groove pulley rotatably but against axial movement relative to the shaft, a component for transmitting power supported for rotation with the complementary flange and in axial alignment with the said drive shaft, a belt trained over the pulleys, an arm of the bell crank extending toward the complementary flange, a brake block on the arm engageable with the complementary flange in a slackened condition, means to rock said rock lever to thereby move said bell crank, and means to bias said first said means in one direction, said belt being tightened on the pulleys in one direction of movement of the bell crank and slackened by an opposite direction of movement of the bell crank.

8. In a clutch device, a frame, a shiftable pivoted link carried by the frame, means to bias the link to one clutch position, a pin on the pivot axis of the link and secured to the link, a rock lever secured to the pin, a bell crank carried by the rock lever, a pulley carried by the bell crank and movable with the bell crank, a split groove pulley spaced from the bell crank and the pulley thereon, a prime mover drive shaft supporting one flange of the split groove pulley fixedly and supporting the complementary flange of the split groove pulley against axial movement but for rotation with respect to the shaft, a component for transmitting power supported for rotation with the complementary flange and in axial alignment with the said drive shaft, said bell crank having an arm extending toward the complementary flange, a brake block on the arm engageable with the complementary flange in a slackened condition of the belt, said belt being tightened on the pulleys by movement of the shiftable link in one direction and slackened by movement of the shiftable link in the opposite direction.

9. In a clutch device, a frame, a shiftable pivoted link carried by the frame, a spring biasing the link in one direction, a tension spring having one end secured to the link, manual means secured to the other end of the tension spring arranged to overcome the bias of the first spring to shift the link pivotally, a pin on the pivot axis of the link and secured to the link, a rock lever secured to the pin, a bell crank carried by the rock lever, a pulley carried by the bell crank and movable with the bell crank, a split groove pulley spaced from the bell crank and the pulley thereon, a prime mover drive shaft supporting one flange of the split groove pulley fixedly and supporting the complementary flange of the split groove pulley against axial movement but for rotation with respect to the shaft, a component for transmitting power supported for rotation with the complementary flange and in axial alignment with the said drive shaft, said bell crank having an arm extending toward the complementary flange, a brake block on the arm engageable with the complementary flange in a slackened condition of the belt, said belt being tightened on the pulleys by movement of the manual means in a direction to overcome the bias of the first spring and slackened by movement of the manual means in the opposite direction.

10. In a clutch device, a drive shaft, a shell supported by the shaft for rotation relative to the shaft, a split groove pulley on the shaft having one flange secured to the shaft for rotation with the shaft and the other complementary flange of the split grooved pulley formed integral with the shell and rotatable with the shell relative to the shaft, a belt passing in the groove of the split pulley and normally lying free in the split grooved pulley, a second pulley also receiving the said belt, said pulleys providing a closed path for the belt, means supporting the second pulley for movement relative to the split grooved pulley for tightening the belt on the pulleys to cause the belt to grip the flanges of the split pulley for rotation of the flanges together, a brake block movable with the second pulley and engageable with the complementary flange in a free condition of the belt, and a shaft component extending in axial alignment with the drive shaft supported by the shell for rotation with the shell.

References Cited in the file of this patent
UNITED STATES PATENTS

| 1,460,070 | Maimin | June 26, 1923 |
| 2,499,219 | Hemmeter | Feb. 28, 1950 |
| 2,499,224 | Lutz | Feb. 28, 1950 |
| 2,615,343 | Koch | Oct. 28, 1952 |